United States Patent
Bonhomme (10) Patent No.: US 8,116,355 B2
(45) Date of Patent: *Feb. 14, 2012

(54) METHOD OF SELECTING ECHOES OF A SIGNAL FOR ASSIGNMENT TO FINGERS OF A RAKE RECEIVER AND CORRESPONDING RAKE RECEIVER

(75) Inventor: Corinne Bonhomme, Sergy (FR)

(73) Assignee: ST-Ericsson SA, Geneva (CH)

( * ) Notice: Subject to any disclaimer, the term of this patent is extended or adjusted under 35 U.S.C. 154(b) by 1689 days.

This patent is subject to a terminal disclaimer.

(21) Appl. No.: 11/031,458

(22) Filed: Jan. 5, 2005

(65) Prior Publication Data

US 2005/0180494 A1 Aug. 18, 2005

(30) Foreign Application Priority Data

Jan. 5, 2004 (EP) .................................... 04290002

(51) Int. Cl.
*H04B 1/707* (2006.01)
(52) U.S. Cl. ........................ 375/150; 375/343; 375/148
(58) Field of Classification Search .................. 375/136, 375/144, 147, 148, 347, 150, 343
See application file for complete search history.

(56) References Cited

U.S. PATENT DOCUMENTS

| | | | |
|---|---|---|---|
| 6,804,312 B1* | 10/2004 | Win et al. | 375/347 |
| 7,016,399 B1* | 3/2006 | Vadgama et al. | 375/148 |
| 7,184,462 B1* | 2/2007 | Atarius et al. | 375/148 |
| 2002/0061052 A1* | 5/2002 | Smolyar et al. | 375/147 |
| 2002/0154719 A1* | 10/2002 | Niva et al. | 375/354 |
| 2004/0029589 A1* | 2/2004 | Becker et al. | 455/437 |
| 2004/0139466 A1* | 7/2004 | Sharma et al. | 725/72 |
| 2005/0094710 A1* | 5/2005 | Ko et al. | 375/145 |

OTHER PUBLICATIONS

Moe Z.Win, George Chrisikos, Nelson R.Sollenberger, "Performance of Rake Reception in Dense Multipath Channels: Implications of Spreading Bandwidth and Selection Diversity Order", IEEE Journal on Selected Areas in Communications, vol. 18, No. 8, Aug. 2000.*

Gunnar Fock, Jens Baltersee, Peter Schultz-Rittich and Heinrich Meyr, Channel tracking for rake receivers in closely spaced multipath environments, Aachen University of Technology, 2001 IEEE.*

Joon-Yong Lee and Robert A.Scholtz, "Ranging in a Dense Multipath Environment Using an UWB Radio Link", University of Southern California, 2002 IEEE.*

(Continued)

*Primary Examiner* — Chieh M Fan
*Assistant Examiner* — Aristocratis Fotakis
(74) *Attorney, Agent, or Firm* — Stephen Bongini; Fleit Gibbons Gutman Bongini & Bianco P.L.

(57) ABSTRACT

A method is provided for processing a signal emanating from a multi-path transmission medium. A number L of echoes of the signal received are detected, with L being greater than the number N of fingers of a "Rake" receiver, and there are selected N echoes from among the L echoes that are detected. At least some of the L echoes that are detected are echoes temporally correlated according to a determined correlation criterion. The selection step includes determining, as a function of the initial complex amplitudes associated with at least the temporally correlated echoes, weighted individual energies corresponding respectively to temporally decorrelated virtual echoes, and selecting from among the L echoes of N echoes as a function of a determined power criterion using at least the weighted individual energies.

20 Claims, 5 Drawing Sheets

OTHER PUBLICATIONS

Win, M.Z. et al., "Impact of Spreading Bandwidth on RAKE Reception in Dense Multipath Channels," 1999, Piscataway, NJ, USA, IEEE, USA, Jun. 6, 1999, pp. 78-82, XP002288556, Vancouver, BC, Canada, ISBN: 0-7803-5653-5.

Fujii, T. et al., "RAKE Received Characteristics Considering Antenna Diversity and Path Diversity for Wideband DS-CDMA System," Electronics & Communications in Japan, Part I—Communications, Scripta Technica, New York, US, vol. 84, No. 10, part 1, 2001, pp. 36-54, XP001065737, ISSN: 8756-6621.

European Search Report dated Jul. 15, 2004 for European Application No. 04 29 0002.

* cited by examiner

METHOD OF SELECTING ECHOES OF A SIGNAL FOR ASSIGNMENT TO FINGERS OF A RAKE RECEIVER AND CORRESPONDING RAKE RECEIVER

CROSS-REFERENCE TO RELATED APPLICATIONS

This application is based upon and claims priority from prior European Patent Application No. 04 290 002.7, filed Jan. 5, 2004, the entire disclosure of which is herein incorporated by reference.

FIELD OF THE INVENTION

The present invention relates to signal processing, and more specifically to the processing of incident signals within a signal receiver.

BACKGROUND OF THE INVENTION

There is known a receiver which combines several components of multi-path signals that are mutually delayed by different time delays before reaching the receiver. Such a receiver is for example present in code division multiple access (CDMA) wireless communication systems and is currently designated by the name of Rake-type receiver or "Rake" receiver.

In a wireless communication system, a base station communicates with a plurality of remote terminals, such as cellular mobile telephones. Frequency division multiple access (FDMA) and time division multiple access (TDMA) are the conventional multiple access systems for delivering simultaneous services to a certain number of terminals. The basic idea underlying the FDMA and TDMA systems is dividing the available resource into several frequencies or into several time slots, respectively, such that several terminals can operate simultaneously without causing interference.

Telephones operating according to the GSM standard belong to the FDMA and TDMA systems in the sense that transmission and reception take place at different frequencies and also in different time slots.

Unlike these systems using frequency division or time division, CDMA systems enable multiple users to share a common frequency and a common time channel by using a coded modulation. Amongst the CDMA systems are the CDMA 2000 system, the WCDMA system (wide band CDMA), and the IS-95 standard.

In CDMA systems, a scrambling code is associated with each base station and is used to distinguish one base station from another. In addition, an orthogonal code, known as the OVSF code, is allocated to each remote terminal (such as a cellular mobile telephone). All the OVSF codes are mutually orthogonal which distinguishes one channel from another.

Before transmitting a signal over the transmission channel to a remote terminal, the signal has been scrambled and spread by the base station using the scrambling code of the base station and the OVSF code of the channel.

In CDMA systems, those that use a distinct frequency for transmission and reception (CDMA-FDD system) can be distinguished from those which use a common frequency for transmission and reception, but distinct time domains for transmission and reception (CDMA-TDD system).

The present invention applies advantageously to communication systems of the CDMA type, and is particularly suited to systems of the WCDMA type with terrestrial radio access (UTRA FDD/TDD).

The incident signal received by a mobile telephone for example comprises different versions delayed in time from the signal initially transmitted, versions or echoes which are the result of the multi-path transmission characteristics of the transmission environment between a base station and the telephone, with each path introducing a different delay.

The "Rake" receiver in a cellular mobile telephone operating in a CDMA communication system is used to carry out temporal alignment, descrambling, compression, channel correction and combination of the delayed versions of the initial signals in order to deliver the information streams (symbols) contained in the initial signals.

A "Rake" receiver comprises several fingers, with each finger being intended to demodulate a given path received at a given instant.

Furthermore, the receiver comprises a channel estimation unit the purpose of which is to identify the various echoes through their delay and their mean energy as well as a mechanism for selecting echoes with a view to their respective assignment to the fingers of the Rake receiver.

Generally, the number of echoes detected is greater than the processing capacity of the receiver (number of fingers) for hardware complexity limitation reasons.

Hence, at the present time use is made of a selection mechanism capable of selecting from among the L echoes detected the N best echoes (N being the number of fingers of the receiver), that is to say those that provide the minimum binary error rate.

The criterion generally adopted is that of the signal-to-noise ratio. Thus, the N echoes with the largest signal-to-noise ratio are selected from among the L echoes detected.

Such a criterion provides a good solution as long as the minimum separation between the various echoes of the radio propagation profile (channel estimation) remains relatively sizeable. To increase the performance of the receiver, it is advisable to take account of close echoes, that is to say temporally correlated echoes.

SUMMARY OF THE INVENTION

In view of these drawbacks, it is an object of the present invention to overcome the above-mentioned drawbacks and to improve the performance of a receiver of the "Rake" type for dense radio propagation profiles, such as for new-generation mobile telephones intended for receiving high-speed data packets (HSDPA).

In the case of HSDPA systems, it is possible to encounter extremely close echoes, that is to say they are temporally spaced apart by a duration less than the duration of a chip.

In CDMA systems in particular, the symbols are transmitted within successive frames that each are subdivided into a certain number of time slots. Each time slot conveys a certain number of symbols that consist of a predetermined number of chips.

One embodiment of the present invention provides a method of processing a signal emanating from a multipath transmission medium. According to the method, a number L of echoes of the signal that is received are detected, with L being greater than a number N of fingers of a "Rake" receiver, and there are selected N echoes from among the L echoes that are detected. At least some of the L echoes that are detected are echoes temporally correlated according to a determined correlation criterion. The selecting step comprises determining, as a function of the initial complex amplitudes associated with at least the temporally correlated echoes, weighted individual energies corresponding to temporally decorrelated virtual echoes, and selecting, from among the L echoes that are detected, N echoes as a function of a determined power criterion taking using at least the weighted individual energies.

Another embodiment of the present invention provides a Rake receiver that includes an input for receiving a signal emanating from a multi-path transmission medium, a detector, and a processor. The detector detects a number L of echoes of the signal that is received, with L being greater than the number N of fingers of the receiver. The processor selects N echoes from among the L echoes that are detected. At least some of the L echoes that are detected are echoes temporally correlated according to a determined correlation criterion. The processor comprises a calculator for determining, as a function of the initial complex amplitudes associated with at least the temporally correlated echoes, weighted individual energies corresponding to temporally decorrelated virtual echoes, and a selector for selecting N echoes from among the L echoes as a function of a determined power criterion using at least the weighted individual energies.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

One preferred embodiment of the present invention provides a method of processing a signal emanating from a multi-path transmission medium. According to the method, there are detected a number L of echoes of the signal received, with L being greater than the number N of fingers of a "Rake" receiver, and N echoes are selected from among the L echoes that are detected. At least some of the L detected echoes are echoes temporally correlated according to a predetermined correlation criterion, and the selection step comprises determining, as a function of the initial complex amplitudes associated with at least the temporally correlated echoes, weighted individual energies corresponding to temporally decorrelated virtual echoes, and selecting from among the L echoes N echoes as a function of a predetermined power criterion using at least the weighted individual energies.

Stated otherwise, the new representation with the aid of the weighted individual energies provides an equivalent representation but with independent fadings and a new distribution of power over these echoes. The fact that the new virtual echoes are independent makes it possible to apply a criterion based on powers but now using modified powers. Also, it can be shown mathematically that this new representation affects neither the noise nor the energy of the whole of the process represented by the L echoes.

According to one embodiment of the present invention, when the signal received conveys symbols that each consist of a predetermined number of chips, two echoes are declared to be temporally correlated when they are spaced apart temporally by a duration less than or equal to the duration of a chip.

Several variant implementations of the present invention may be envisaged. According to a first variant, weighted individual energies may be determined with the help of the initial complex amplitudes of the whole set of the L echoes. Thus, for example, in the selection step all possible combinations of N echoes from among the L detected echoes are defined, and for each of the combinations, a set of N weighted individual energies is calculated with the help of the initial complex amplitudes of the N echoes of the combination, as is the sum of these N weighted individual energies, and the combination of N echoes whose associated sum is the largest is selected.

The calculation of the set of N weighted individual energies which is associated with a combination of N echoes, comprises, for example, the determination of the covariance matrix of the initial complex amplitudes of the N echoes, and the determination of the N eigenvalues of the covariance matrix.

The implementation of such a variant when the number N is relatively large, for example greater than four, becomes complex by reason of the large size of the covariance matrix that has to be first estimated on the basis of measurement on the echoes and subsequently to be diagonalized. This complexity is relatively large for standard CDMA receivers.

Thus, provision is made for another variant implementation of the present invention, which is much more suitable for more concrete propagation profiles. According to this variant, the echoes can be grouped together into a family of dense echoes (that is to say temporally correlated) and a family of sparse echoes (that is to say distant).

Stated otherwise, according to this variant of the present invention, assuming that the L detected echoes comprise L1 temporally correlated echoes and L−L1 possible remaining "far" echoes, with L1 being greater than or equal to 2 and less than or equal to L, the selection step comprises a first selection according to a first selection criterion of L2 echoes from among the L1 echoes, with L2 being less than or equal to L1.

For example, in the case where L1 is an odd number, at least one of the L1 temporally correlated echoes will be eliminated, in such a way as to obtain an even number L2. If on the other hand L1 is already even, then it will be possible to choose L2=L1 and to perform no first selection.

Provision is moreover made for a determination with the help of the initial complex amplitudes of the L2 echoes of the weighted individual energies corresponding respectively to temporally decorrelated virtual echoes, as well as an assignment of these weighted individual energies to the L2 echoes selected.

Next, the N echoes are selected from among the L2 echoes and the L−L1 far echoes as a function of a predetermined power criterion taking into account the L2 weighted individual energies and the L−L1 initial individual energies of the L−L1 possible remaining echoes.

When the number L2 is even, the L2 echoes are advantageously processed in pairs. Thus, for example, for each pair of echoes a pair of weighted individual energies is calculated with the help of the initial complex amplitudes of the pair of echoes, and the N echoes having the N largest energy values from among the L2 weighted individual energies and the L−L1 initial individual energies of the possible L−L1 far echoes.

The calculation of a pair of weighted individual energies which is associated with a pair of echoes, comprises, for example, the determination of the covariance matrix of the initial complex amplitudes of the echoes, and the determination of the two eigenvalues of the covariance matrix.

Another preferred embodiment of the present invention provides a receiver of the "Rake" type that includes an input for receiving a signal emanating from a multi-path transmission medium, and means for detecting a number L of echoes of the signal received, with L being greater than the number N of fingers of the "Rake" receiver, and processing means for selecting N echoes from among the L echoes. At least some of the L detected echoes are echoes temporally correlated according to a determined correlation criterion, and the processing means comprises calculation means for determining, as a function of the initial complex amplitudes associated with at least the temporally correlated echoes, weighted individual energies corresponding to temporally decorrelated virtual echoes. Selection means selects N echoes from among the L echoes as a function of a predetermined power criterion using at least the weighted individual energies.

According to one embodiment of the present invention, the determination means is able to determine weighted individual energies with the help of the initial complex amplitudes of the whole set of the L echoes.

According to one embodiment of the present invention, the calculation means is able to define all the possible combinations of N echoes from among the L detected echoes, and for each of the combinations, to calculate a set of N weighted individual energies with the help of the initial complex amplitudes of the N echoes of the combination, and also the sum of these N weighted individual energies, and the selection means selects the combination of N echoes whose associated sum is the largest.

According to one embodiment of the present invention, the calculation means is able, for the calculation of the set of N weighted individual energies which is associated with a combination of N echoes, to determine the covariance matrix of the initial complex amplitudes of the N echoes, and to determine the N eigenvalues of the covariance matrix.

According to another variant of the present invention, the L detected echoes comprise L1 temporally correlated echoes, and L−L1 possible remaining far echoes, with L1 being greater than or equal to 2 and less than or equal to L. The processing means comprises auxiliary selection means for performing a first selection according to a first selection criterion of L2 echoes from among the L1 echoes, with L2 being less than or equal to L1.

The calculation means is able to determine, with the help of the initial complex amplitudes of the L2 echoes, weighted individual energies corresponding to temporally decorrelated virtual echoes, and to assign these weighted individual energies to the L2 selected echoes and selection means are able to select the N echoes from among the L2 echoes and the L−L1 far echoes, as a function of a predetermined power criterion taking into account the weighted individual energies and the L−L1 individual energies of the L−L1 remaining echoes.

In the case where L1 is an odd number the auxiliary selection means is able to eliminate at least one of the L1 temporally correlated echoes, in such a way as to obtain an even number L2.

According to one embodiment of the present invention, the calculation means processes the L2 echoes pairwise. For each pair of echoes, the calculation means calculates a pair of weighted individual energies with the help of the initial complex amplitudes of the pair of echoes, and the selection means selects the N echoes having the N largest energy values from among the L2 weighted individual energies and the L−L1 initial individual energies of the possible L−L1 far echoes.

According to one embodiment of the present invention, for the calculation of a pair of weighted individual energies which is associated with a pair of echoes, the calculation means determines the covariance matrix of the initial complex amplitudes of the echoes, and determines the 2 eigenvalues of the covariance matrix.

Another embodiment of the present invention provides a component of a wireless communication system that incorporates a receiver as defined hereinabove. In one exemplary embodiment, this component is a cellular mobile telephone.

Exemplary embodiments of the present invention will now be described in detail with reference to the figures.

Figure 1:
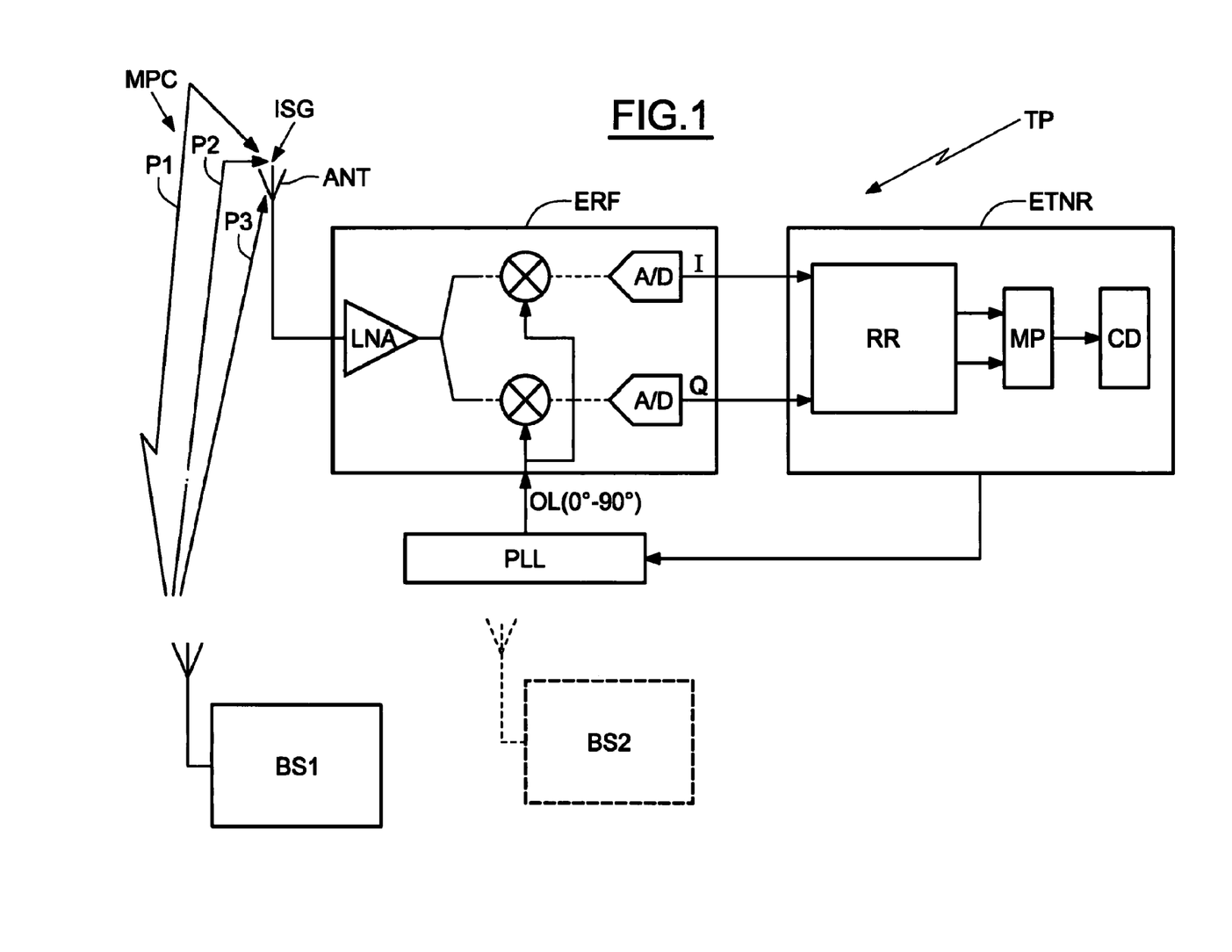
FIG. 1 illustrates a cellular mobile telephone incorporating a "Rake" receiver in accordance with a preferred embodiment of the present invention.

FIG. 1 shows a remote terminal, such as a cellular mobile telephone, incorporating a "Rake" receiver in accordance with a preferred embodiment of the present invention. As shown in FIG. 1, the cellular mobile telephone TP is communicating with a base station BS1, for example according to a communication scheme of the CDMA-FDD type.

The cellular mobile telephone TP comprises an analog radio frequency stage ERF connected to an antenna ANT to receive an input signal ISG.

The ERF stage comprises a low noise amplifier LNA and two processing channels comprising mixers, filters and conventional amplifiers. The two mixers receive from a phase locked loop PLL two signals mutually presenting a phase difference of 90°. After frequency transposition in the mixers, the two processing channels respectively define two streams I (direct stream) and Q (quadrature phase stream) according to the well known denomination.

After digital conversion in analog/digital converters, the two streams I and Q are delivered to a reception processing stage ETNR.

The reception processing stage ETNR comprises a "Rake receiver" RR, followed by a demodulator MP which demodulates the constellation delivered by the Rake receiver RR. The demodulator MP is followed by a channel decoder CD.

Because of possible reflections of the initially transmitted signal on obstacles situated between the base station and the mobile telephone, the transmission environment is in fact a multi-path transmission environment MPC having several different transmission paths (three exemplary transmission paths P1, P2, and P3 are shown in FIG. 1). In consequence, the signal ISG which is received by the mobile telephone comprises different versions delayed in time from the signal initially transmitted, versions or echoes which are the result of the characteristics of multi-path transmission of the transmission environment. And, each path introduces a different delay. Naturally, the received signal ISG could also result from the transmission of initial signals transmitted by different base stations BS1 and BS2.

Figure 2:
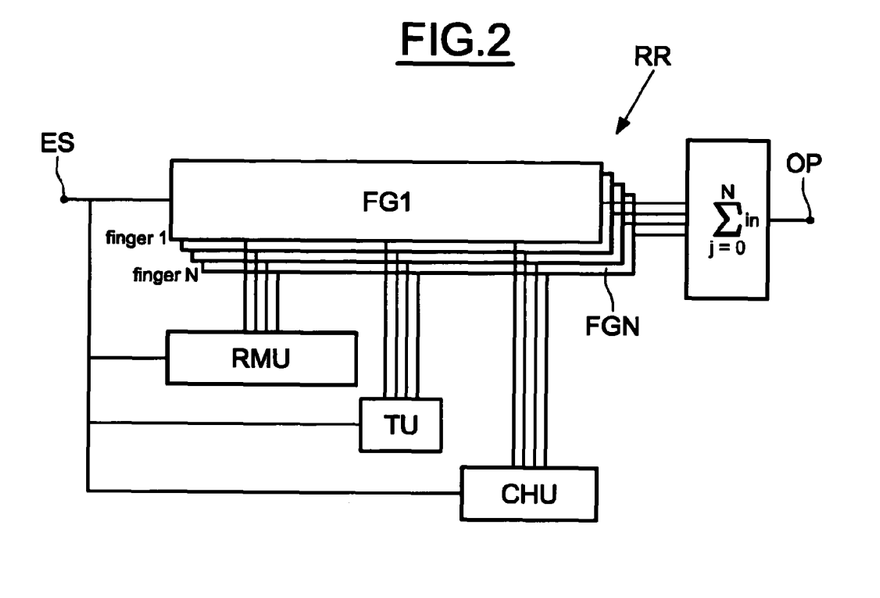
FIGS. 2 to 4 illustrate the functionality and internal architecture of a "Rake" receiver according to one embodiment the present invention.

FIG. 2 illustrates the basic functionalities of the "Rake" receiver according to one embodiment the present invention. The "Rake" receiver RR is formed of several fingers (here N fingers) FG1-FGN. Each finger is designed to demodulate a given path received at a given moment. Baseband demodulation essentially consists in a descrambling and a despreading. The despreading is in reality a correlation and so requires an integration over the symbol period. The receiver then combines the information received on each finger in a combination circuit MCMB, by summing them after having corrected the phase and amplitude distortions of each path (unit CHU described below). Naturally, the multiple fingers represented in FIG. 2 may be formed of the same physical finger, reconfigured N times to produce the N functional fingers.

The receiver also comprises a channel estimation unit CHU capable of supplying a transmission channel estimate, with the aim of correcting the channel distortions.

It is necessary to allocate N paths (echoes) to the digits of the receiver. This is done by a control unit RMU, after selection of N echoes.

Finally, since the timing relating to the paths may vary over time, a tracking unit monitors the timing of the paths and updates the fingers with that information.

Figure 3:
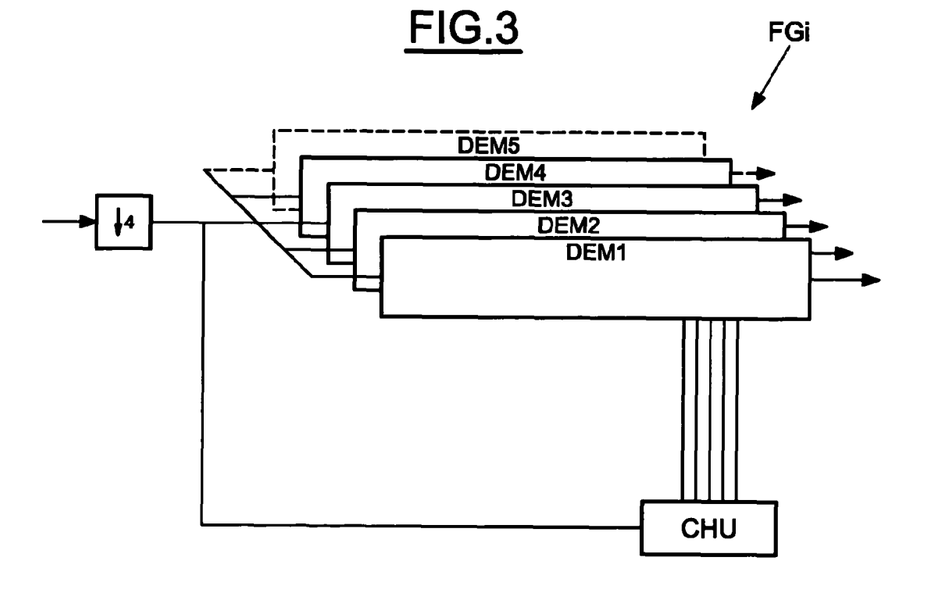

As shown in FIG. 3, each finger FGi comprises a code generator CG capable of producing the scrambling codes and the OVSF codes, a sub-sampler, in this instance a sub-sampler by four, disposed at the input of the finger, and a channel estimation unit CHU.

Furthermore, the finger FGi comprises several physical transmission channel demodulators, in this case four demodulators DEM1-DEM5. Each channel demodulator performs the functions of descrambling, despreading and integration, as well as the previously mentioned channel correction functions. The channel estimation unit CHU is shared by all the physical transmission channels.

Figure 4:
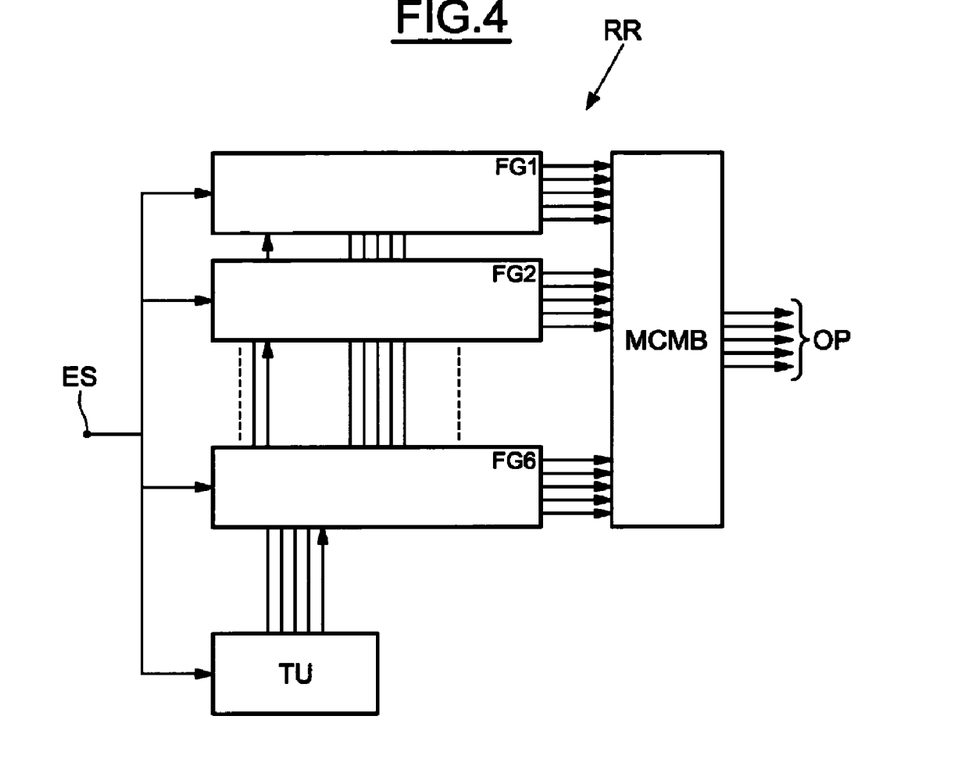

FIG. 4 partially illustrates the internal architecture of a "Rake" receiver RR according to this embodiment. As shown, there are between the signal input ES and the output OP which delivers the information relating to the different physical transmission channels (in this case five physical channels), the fingers of the receiver, in this case six fingers FG1-FG6, connected at the output to combination circuit MCMB.

Figure 5:
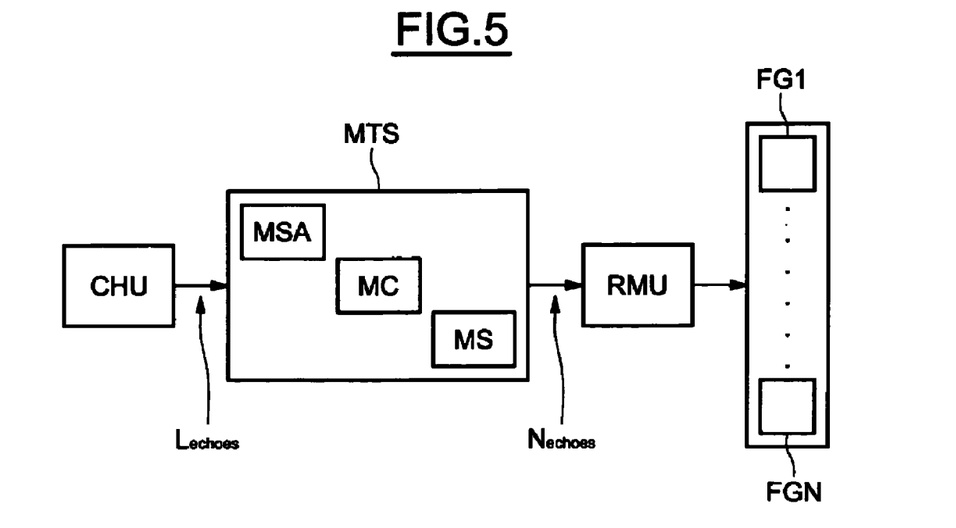
FIG. 5 illustrates in greater detail the processing circuitry of a Rake receiver according to one embodiment of the present invention.

FIG. 5 illustrates in greater detail the processing circuitry of a Rake receiver according to a first embodiment of the present invention. As shown, the channel estimation unit CHU has detected for example L echoes each characterized by its delay t, its complex amplitude (amplitude and phase) s and its "initial" individual energy, which is equal to the product of s and of its complex conjugate (s.s*).

These L echoes have been detected in a conventional manner, subsequent to an estimation of the impulse response of the channel, using for example the method of local maxima.

A processor MTS, for example embodied in software form, then selects, from among these L echoes, N echoes which will then be assigned to the N fingers of the rake receiver by the unit RMU.

Alternatively, the processor MTS may be hardware incorporated within the unit RMU.

The processor MTS comprises various software blocks, namely an auxiliary selector MSA, a calculator MC and a selector MS, the functions of which are described in greater detail hereinbelow.

Among these L detected echoes, some of them, possibly all, may be echoes that are close together, that is to say temporally correlated echoes.

Although it is possible to adopt several criteria to define what is meant by two temporally correlated echoes, a particularly simple way is to use the duration of a chip. Thus, two echoes will be declared to be temporally correlated when they are temporally spaced apart by a duration less than the duration of a chip. By way of indication, in some CDMA systems, the duration of a chip is equal to 260.417 nanoseconds.

The fadings which affect the L echoes that are generally considered to be complex Gaussian are not independent and it is possible to associate their covariance matrix K with them. This matrix of dimension L×L is represented by its elements $A(i,j)=E[s(i)s(j)*]$, where E designates the "mathematical expectation" operator, and * designates the complex conjugate.

When the echoes are relatively separated, that is to say not temporally correlated, with for example a minimum separation greater than the duration of a chip, then this matrix is practically diagonal and its diagonal elements consist of the initial individual average energies of the echoes. Also, a representation is obtained solely with the aid of these initial individual energies.

However, for dense echoes, the covariance matrix can no longer be regarded as a diagonal matrix. Hence, the present invention provides for a new representation of the L echoes, this new representation, equivalent to the previous one, implementing temporally decorrelated virtual echoes associated with independent fadings, as well as a new distribution of power over these echoes.

The fact that the new echoes (virtual echoes) are independent then makes it possible to apply a power criterion to the weighted individual energies of these new echoes rather than to the initial individual energies.

Figure 6:
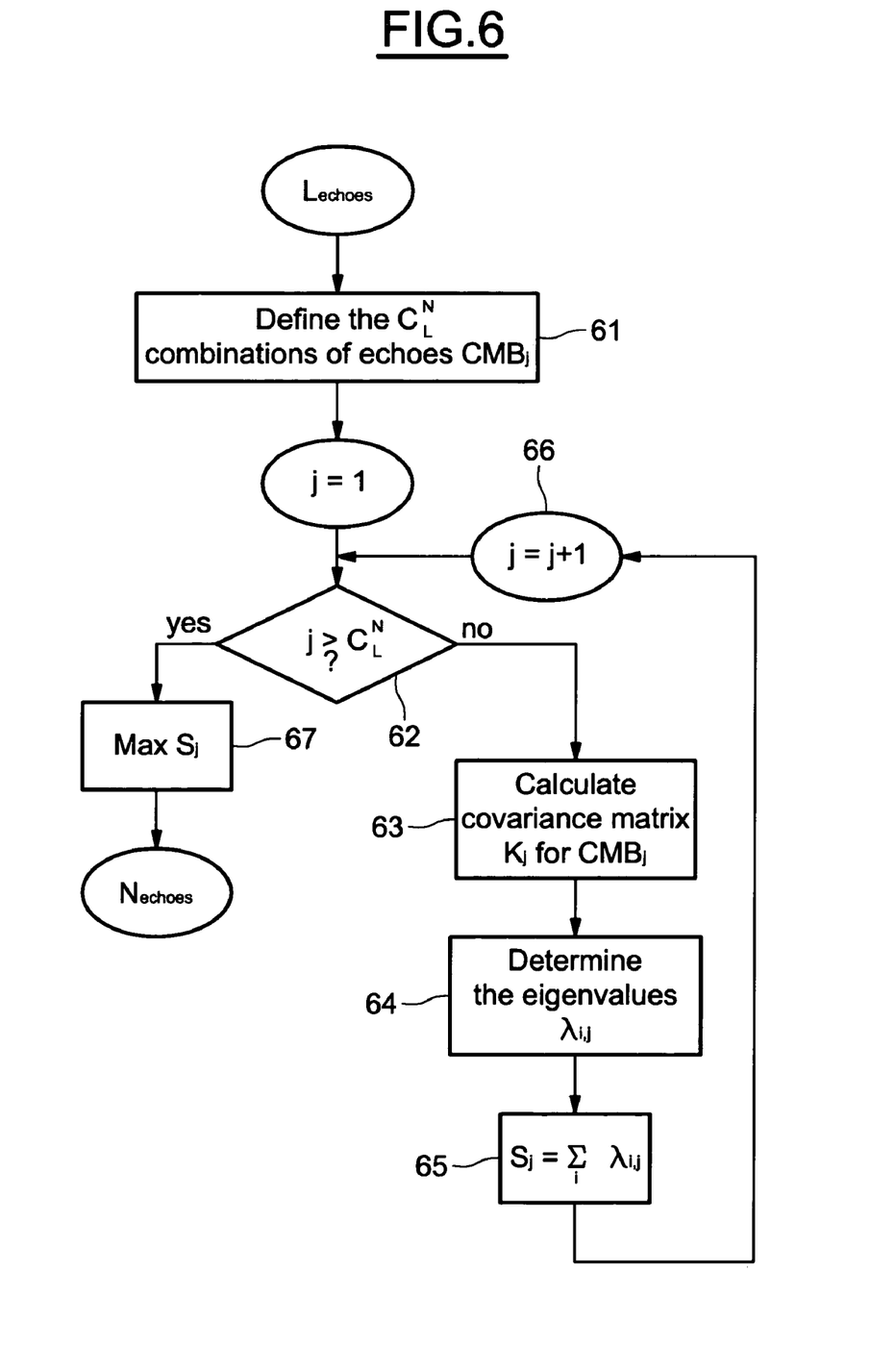
FIG. 6 illustrates a method according to a first embodiment of the present invention.

More precisely, according to a first variant of the method according to the present invention illustrated in FIG. 6, the whole set of L echoes is taken into account, be they temporally correlated or otherwise, to calculate weighted individual energies corresponding to temporally decorrelated virtual echoes.

That said, in practice, simply calculating the eigenvalues causes the link between the echo and the eigenvalue associated therewith to be lost and hence it then becomes difficult to decide which echoes to preserve.

The variant implementation illustrated in FIG. 6 affords a solution to this problem. In this regard, all the possible combinations of N echoes out of L are defined (step 61) so as to obtain $C_L^N$ combinations $CMB_j$.

Next, for each of these combinations $CMB_j$, the associated covariance matrix $K_j$ is calculated (step 63).

The N eigenvalues $\lambda_j$ associated with the N echoes of the combination considered are subsequently determined in a conventional manner (step 64). These eigenvalues constitute the weighted individual energies.

Next, the sum of these weighted individual energies is calculated so as to obtain a sum Sj associated with the combination considered of N echoes (step 65).

When all the combinations have been processed, the maximum sum is determined (step 67) and the N echoes of the combination associated with this maximum sum will then be selected.

Operationally, in this embodiment the calculator MC incorporated into the processor MTS which performs steps 63 to 65, whereas step 67 is performed by the selector MS.

That said, the implementation of such a variant becomes relatively complicated when the number of fingers is relatively large, for example greater than four. Such is the case for standard CDMA receivers.

Figure 7:
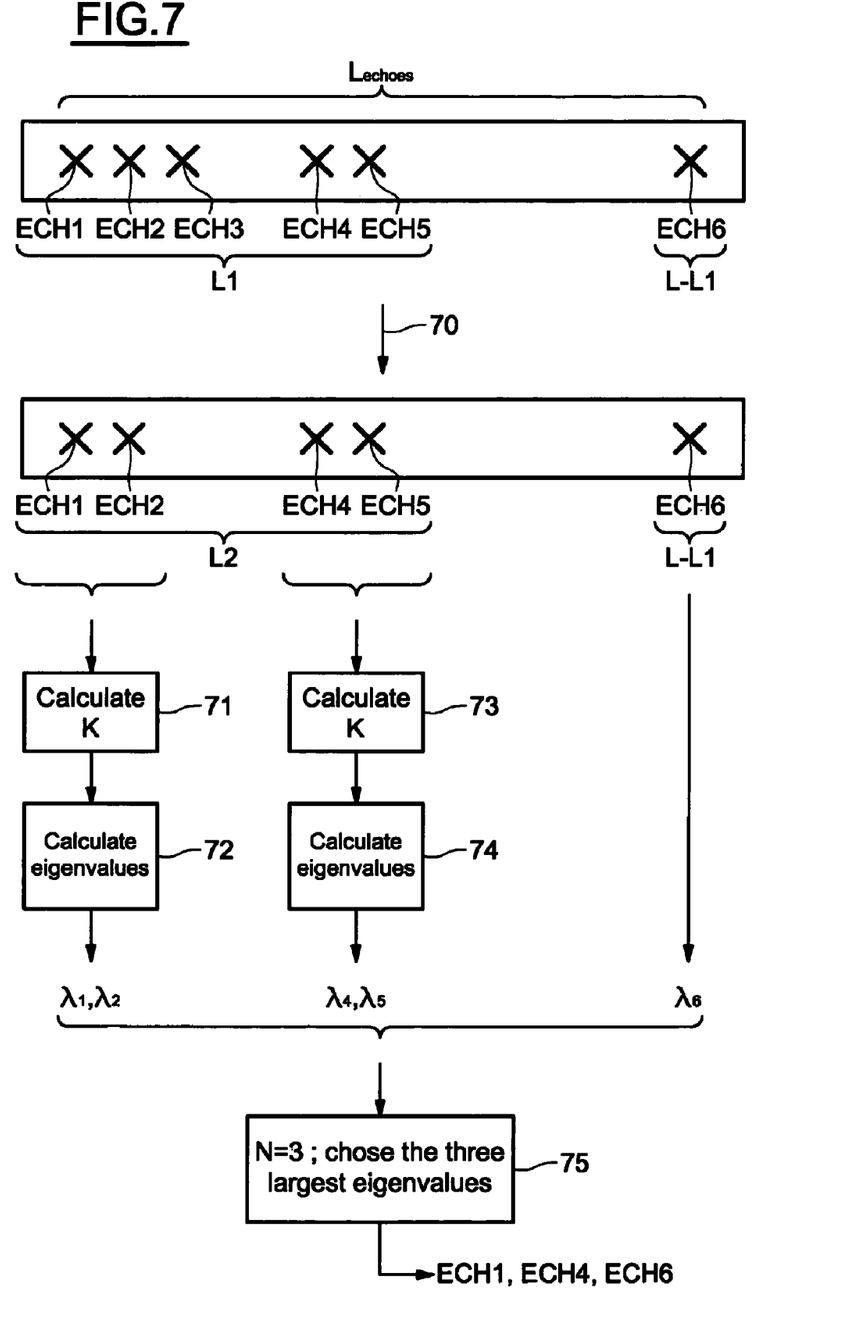
FIG. 7 illustrates a method according to a second embodiment of the present invention.

Hence, the present invention proposes another variant implementation which makes it possible to approximate the complete calculation for the most concrete cases of propagation profiles. Such a variant implementation is illustrated in FIG. 7.

In a general manner, the echoes are grouped into a family of dense echoes (temporally correlated) and (possible) remaining echoes, that is to say distant echoes. Next, the procedure for calculating the weighted individual energies is applied to the family of dense echoes and the remainder of the echoes will be kept intact.

More precisely, if L echoes (6 in FIG. 7) and three fingers (N=4) are considered, it is seen that the L echoes comprise five dense echoes ECH1-ECH5 formed with two families ECH1-ECH3 and ECH4-ECH5, as well as a distant echo ECH6.

The auxiliary selector MSA of the processor MTS will then advantageously eliminate a dense echo from among the five echoes ECH1-ECH5. Also, more precisely, since pairs of echoes will be worked on subsequently, the auxiliary selector MSA will delete an echo from among the family of the first three echoes ECH1-ECH3. This deletion may be performed according to a power criterion. It will for example be possible to eliminate the echo having the lowest initial individual energy.

After the preselection (step 70), it is then assumed that L2 temporally correlated echoes are obtained, formed of two pairs of echoes ECH1-ECH2 on the one hand and ECH4-ECH5 on the other hand, as well as a remaining echo ECH6.

The calculation means then determines for the pair of echoes ECH1-ECH2 the corresponding covariance matrix which is now a 2×2 matrix. The calculation of the eigenvalues (step 72) then turns out to be particularly simple and provides the two eigenvalues $\lambda 1$ and $\lambda 2$ which correspond to the weighted individual energies of the new virtual echoes. Also, since the covariance matrix is a 2×2 matrix, the link between the echo and its eigenvalue is not lost.

The calculator performs the same operations (step 73 and step 74) for the pair of echoes ECH4 and ECH5 so as to obtain two eigenvalues $\lambda 4$ and $\lambda 5$. Moreover, the value $\lambda 6$ corresponds to the initial individual energy of the echo ECH6.

Next, since N is here equal to 3, the selector will choose three eigenvalues from among the five eigenvalues $\lambda 1, \lambda 2, \lambda 4, \lambda 5$ and $\lambda 6$.

Also, here, the selection criterion consists simply in choosing the three largest eigenvalues and consequently in selecting the three corresponding echoes, that in the present case are assumed to be the echoes ECH1, ECH4 and ECH6.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of processing a signal emanating from a multipath transmission medium, said method comprising the steps of:
   detecting a number L of echoes of the signal that is received, with L being greater than a number N of fingers of a "Rake" receiver; and
   selecting N echoes from among the L echoes that are detected,
   wherein at least some of the L echoes that are detected are echoes temporally correlated according to a determined correlation criterion,
   the selecting step comprises the sub-steps of:
      determining, as a function of the initial complex amplitudes associated with at least the temporally correlated echoes, weighted individual energies corresponding to temporally decorrelated virtual echoes; and
      selecting, from among the L echoes that are detected, N echoes as a function of a determined power criterion using at least the weighted individual energies, and
   the determining sub-step comprises calculating a set of N weighted individual energies for at least one possible combination of N echoes from among the L echoes, the calculation of the set of N weighted individual energies comprising determining the covariance matrix of the initial complex amplitudes of the N echoes, and the N eigenvalues of the covariance matrix.

2. The method according to claim 1, wherein weighted individual energies are determined as a function of the initial complex amplitudes of the whole set of the L echoes.

3. The method according to claim 1, wherein in the selecting step, all possible combinations of N echoes from among the L echoes that are detected are defined, and for each of the combinations, the set of N weighted individual energies is calculated as a function of the initial complex amplitudes of the N echoes of the combination, as the sum of these N weighted individual energies, and the combination of N echoes whose associated sum is the largest is selected.

4. The method according to claim 1,
   wherein the signal that is received conveys symbols that each consist of a predetermined number of chips, and
   two echoes are declared to be temporally correlated when the two echoes are spaced apart temporally by a duration less than or equal to the duration of a chip.

5. The method according to claim 1, wherein the temporally correlated echoes are temporally spaced apart by a duration less than the duration of a chip.

6. The method according to claim 1, wherein the temporally correlated echoes are temporally spaced apart by a duration less than or equal to the duration of a chip.

7. A method of processing a signal emanating from a multipath transmission medium, said method comprising the steps of:
   detecting a number L of echoes of the signal that is received, with L being greater than a number N of fingers of a "Rake" receiver; and
   selecting N echoes from among the L echoes that are detected,
   wherein at least some of the L echoes that are detected are echoes temporally correlated according to a determined correlation criterion,
   the selecting step comprises the sub-steps of:
      determining, as a function of the initial complex amplitudes associated with at least the temporally correlated echoes, weighted individual energies corresponding to temporally decorrelated virtual echoes; and
      selecting, from among the L echoes that are detected, N echoes as a function of a determined power criterion using at least the weighted individual energies,
   the L echoes that are detected comprise L1 temporally correlated echoes, and L-L1 possible remaining far echoes, with L1 being greater than or equal to 2 and less than or equal to L, and
   the selecting step comprises first selecting according to a first selection criterion of L2 echoes from among the L1 echoes, with L2 being less than or equal to L1, determining as a function of the initial complex amplitudes of the L2 echoes of the weighted individual energies corresponding to temporally decorrelated virtual echoes, assigning these weighted individual energies to the L2 selected echoes, and selecting, from among the L2 echoes and the L-L1 far echoes, the N echoes as a function of a determined power criterion using the weighted individual energies and the L-L1 individual energies of the L-L1 remaining echoes.

8. The method according to claim 7, wherein in the case where L1 is an odd number, at least one of the L1 temporally correlated echoes is eliminated so as to obtain an even number L2.

9. The method according to claim 8,
wherein the L2 echoes are processed pairwise,
for each pair of echoes a pair of weighted individual energies is calculated as a function of the initial complex amplitudes of the pair of echoes, and
the N echoes having the N largest energy values from among the L2 weighted individual energies and the L-L1 initial individual energies of the possible L-L1 far echoes are selected.

10. The method according to claim 9, wherein the calculation of a pair of weighted individual energies which is associated with a pair of echoes comprises determining the covariance matrix of the initial complex amplitudes of the echoes, and the 2 eigenvalues of the covariance matrix.

11. A receiver of the "Rake" type, the receiver comprising:
an input for receiving a signal emanating from a multi-path transmission medium;
a detector for detecting a number L of echoes of the signal that is received, with L being greater than the number N of fingers of the receiver; and
a processor for selecting N echoes from among the L echoes that are detected,
wherein at least some of the L echoes that are detected are echoes temporally correlated according to a determined correlation criterion,
the processor comprises:
a calculator for determining, as a function of the initial complex amplitudes associated with at least the temporally correlated echoes, weighted individual energies corresponding to temporally decorrelated virtual echoes; and
a selector for selecting N echoes from among the L echoes as a function of a determined power criterion using at least the weighted individual energies,
the calculator calculates a set of N weighted individual energies for at least one possible combination of N echoes from among the L echoes, and
to calculate the set of N weighted individual energies, the calculator determines the covariance matrix of the initial complex amplitudes of the N echoes, and determines the N eigenvalues of the covariance matrix.

12. The receiver according to claim 11, wherein the calculator determines weighted individual energies as a function of the initial complex amplitudes of the whole set of the L echoes.

13. The receiver according to claim 11,
wherein the calculator defines all possible combinations of N echoes from among the L echoes that are detected, and
for each of the combinations, calculates the set of N weighted individual energies as a function of the initial complex amplitudes of the N echoes of the combination, and also the sum of these N weighted individual energies, and
the selector selects the combination of N echoes whose associated sum is the largest.

14. The receiver according to claim 11,
wherein the signal that is received conveys symbols that each consist of a determined number of chips, and two echoes are declared to be temporally correlated when the two echoes are spaced apart temporally by a duration less than or equal to the duration of a chip.

15. A component of a wireless communication system, the component including the receiver according to claim 11.

16. A cellular mobile telephone including the receiver according to claim 11.

17. A receiver of the "Rake" type, the receiver comprising:
an input for receiving a signal emanating from a multi-path transmission medium;
a detector for detecting a number L of echoes of the signal that is received, with L being greater than the number N of fingers of the receiver; and
a processor for selecting N echoes from among the L echoes that are detected,
wherein at least some of the L echoes that are detected are echoes temporally correlated according to a determined correlation criterion,
the processor comprises:
a calculator for determining, as a function of the initial complex amplitudes associated with at least the temporally correlated echoes, weighted individual energies corresponding to temporally decorrelated virtual echoes; and
a selector for selecting N echoes from among the L echoes as a function of a determined power criterion using at least the weighted individual energies,
the L detected echoes comprises L1 temporally correlated echoes, and L-L1 possible remaining far echoes, with L1 being greater than or equal to 2 and less than or equal to L,
the processor comprises an auxiliary selector for performing a first selection according to a first selection criterion of L2 echoes from among the L1 echoes, with L2 being less than or equal to L1,
the calculator determines, as a function of the initial complex amplitudes of the L2 echoes, weighted individual energies corresponding to temporally decorrelated virtual echoes, and assigns these weighted individual energies to the L2 selected echoes, and
the selector selects the N echoes from among the L2 echoes and the L-L1 far echoes, as a function of a determined power criterion using at least the weighted individual energies and the L-L1 initial individual energies of the L-L1 remaining echoes.

18. The receiver according to claim 17, wherein in the case where L1 is an odd number, the auxiliary selector eliminates at least one of the L1 temporally correlated echoes so as to obtain an even number L2.

19. The receiver according to claim 18,
wherein the calculator processes the L2 echoes pairwise,
for each pair of echoes, the calculator calculates a pair of weighted individual energies as a function of the initial complex amplitudes of the pair of echoes, and
the selector selects the N echoes having the N largest energy values from among the L2 weighted individual energies and the L-L1 initial individual energies of the possible L-L1 far echoes.

20. The receiver according to claim 19, wherein for the calculation of a pair of weighted individual energies which is associated with a pair of echoes, the calculator determines the covariance matrix of the initial complex amplitudes of the echoes, and the 2 eigenvalues of the covariance matrix.

* * * * *